Aug. 22, 1967  J. A. GULOTTA  3,337,318
MANUFACTURE OF GLASS SHEETS ON A PLURALITY OF
DIFFERENT FLUID SUPPORTS
Filed Jan. 16, 1963  3 Sheets-Sheet 1
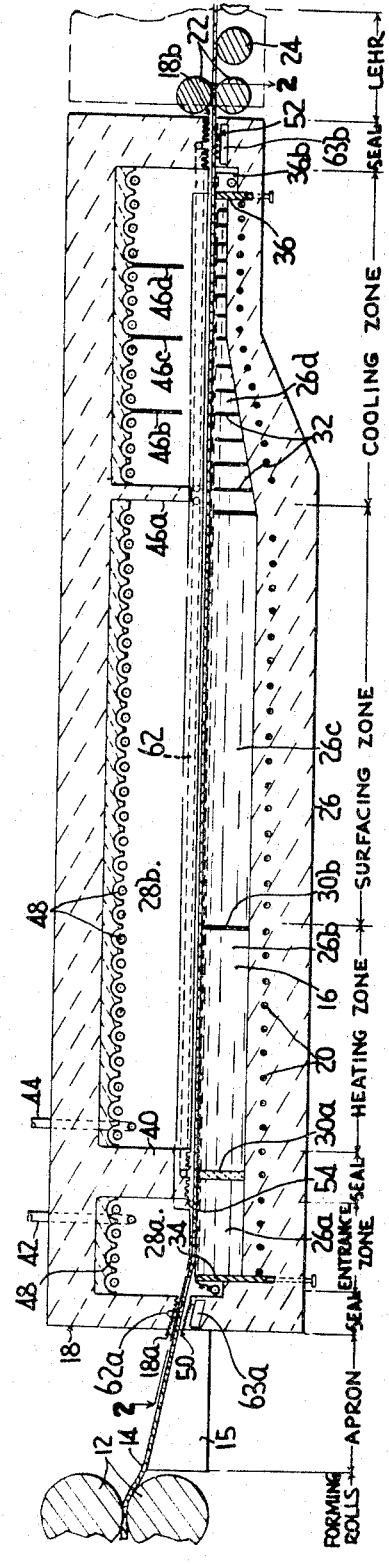
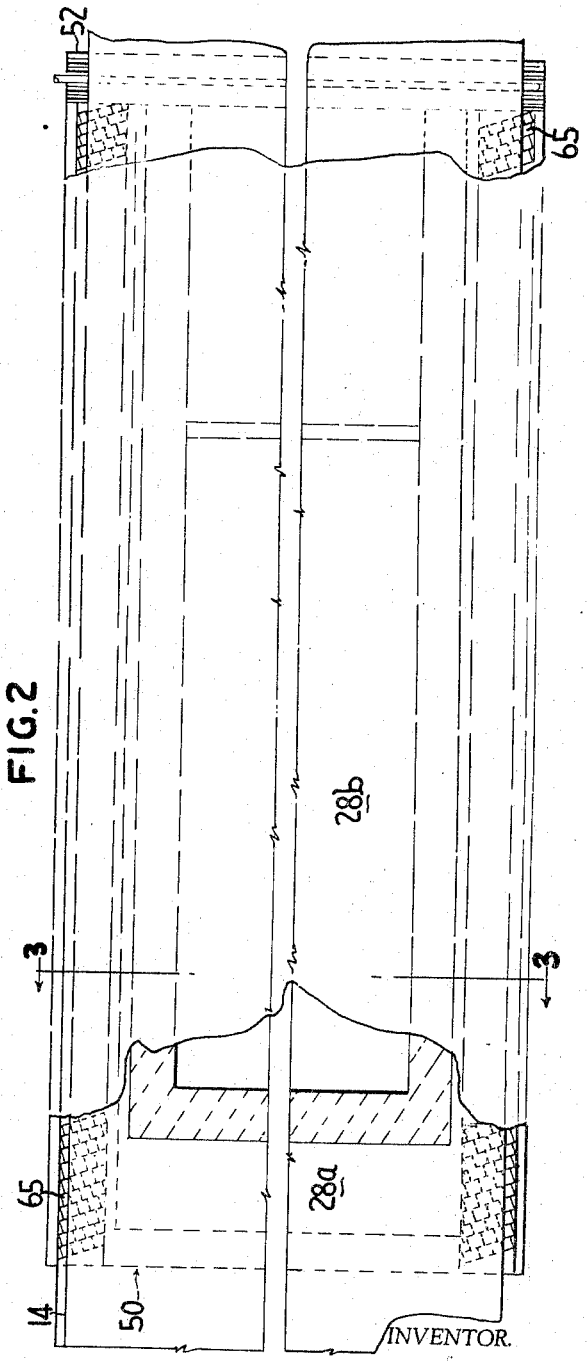
INVENTOR.
JOSEPH A. GULOTTA
BY
ATTORNEY INVENTOR.
JOSEPH A. GULOTTA
BY
Oscar H. Spencer
ATTORNEY.

Aug. 22, 1967  J. A. GULOTTA  3,337,318
MANUFACTURE OF GLASS SHEETS ON A PLURALITY OF
DIFFERENT FLUID SUPPORTS
Filed Jan. 16, 1963  3 Sheets-Sheet 3

INVENTOR.
JOSEPH A. GULOTTA
BY Oscar H. Spencer
ATTORNEY

United States Patent Office
3,337,318
Patented Aug. 22, 1967

3,337,318
MANUFACTURE OF GLASS SHEETS ON A PLURALITY OF DIFFERENT FLUID SUPPORTS
Joseph A. Gulotta, New Kensington, Pa., assignor to Pittsburgh Plate Glass Company, Pittsburgh, Pa., a corporation of Pennsylvania
Filed Jan. 16, 1963, Ser. No. 251,849
3 Claims. (Cl. 65—25)

This application relates to the manufacture of flat glass by floating glass on a liquid bath, such as molten metal, so that the resultant flat glass has fire-finished surfaces requiring little or no additional surfacing for ultimate use.

It has been proposed heretofore to produce flat glass by floating a ribbon or sheet of glass upon the surface of a bath of molten metal. The product produced by this process has an equilibrium or natural thickness of approximately ¼ inch and surfaces which differ somewhat from each other. The top surface thereof, because of the heat involved, has a fire-finished surface. The bottom of the ribbon in contact with the molten metal is flat and has a surface having a similar appearance to a fire-finished surface.

In known processes of producing flat glass by floating a ribbon on a molten bath, the ribbon may be preformed and then deposited upon the bath. Generally, the ribbon may be freely floating and laterally unconfined for a substantial distance during which the ribbon is finished and cooled to a temperature at which physical damage will not result from contact with the conveying rolls at the end of the bath. Characteristic of such a process are undesirable, sharp, knife-like edges along the marginal edges of the glass formed by the surface tension forces of the molten glass and the supporting bath. Such edges are prone to chipping and make both manual and automatic handling difficult. In addition, bulb edges are much more desirable if the glass is to be subjected to a further surfacing operation, such as rouge polishing.

It has also been found that the freely floating ribbon, having little inherent rigidity due to its molten condition, tends, on occasions, to move laterally on the bath in response to convection currents. As a result, the ribbon edges may not be straight and, if the ribbon should remain off center, downstream processing of the ribbon would become difficult.

The present invention is directed to a method and apparatus for eliminating the aforementioned knife edges formed along the margins of a molten glass ribbon floated on a liquid bath and also for facilitating better lateral control of the ribbon on the bath.

In accordance with an embodiment of this invention, a longitudinally extending central portion of a glass ribbon is supported on a liquid bath while one or both longitudinally extending marginal edges are supported at substantially the same level on a flow of gas. The flow of gas is controlled to provide a uniform supporting force substantially equivalent to that of the liquid bath, thus assuring overall flatness of the ribbon. However, by virtue of the gaseous support at the edges of the ribbon, the surface tension forces are different from those produced by a molten metal bath and a rounded or bulb edge is formed along the ribbon margins.

By controlling the temperature of the supporting gas at the ribbon margins, the edges may be maintained at any temperature desired. Thus, for maximum stability of the floating ribbon, particularly where laterally unrestrained, the support gas may be supplied at a temperature sufficiently low to stiffen the margins while the major portion of the ribbon floating on the molten bath remains at the higher temperatures necessary for processing.

According to an effective method of practicing the invention, a ribbon of glass is pre-sized as to thickness and width by convenient means, such as by passing molten glass through a slot or between sizing rolls and cooling the ribbon to stabilize its dimensions. This ribbon is then passed to a pool of molten metal bordered on the two sides that extend in the direction of ribbon travel by gas support beds. The central area of the ribbon overlies the molten bath while the edges extend beyond the bath and over the gas support beds. Gas, inert with respect to the bath, is supplied to the bed under pressure and at a temperature sufficiently low to stiffen the edges of the ribbon. The molten bath and radiant heaters above the ribbon provide the necessary heat to the central portion to raise the ribbon temperature to a melting temperature of the glass. After the surfaces of the ribbon have improved, i.e., become smooth and surface defects have been eliminated or reduced in magnitude or number, the entire ribbon is cooled to a stiffened state and is removed from the metal. In a continuous process, the ribbon may be conveyed along the bath by traction rolls acting upon that portion of the ribbon already removed from the bath.

A further embodiment of the invention utilizes an extended gas support bed beneath one side of a ribbon to produce a ribbon, part of which is of a different thickness from the remainder. This occurs because the thickness attained by a molten body of glass at equilibrium varies with different support media. Thus, molten glass supported upon a gaseous medium stabilizes at a slightly thicker dimension than glass supported upon a molten mass of metal. The thickness as well as the knife edges can therefore be varied by gaseous support, due in part to the change in surface tension forces.

As disclosed and claimed in the copending application of Edmund R. Michalik, Ser. No. 188,664, filed Apr. 19, 1962, it has been found that the equilibrium thickness can be varied by applying a fluid pressure to the upper surface of a central portion of a floating ribbon that is different from the pressure applied to the marginal edges of the ribbon and the peripheral portion of the supporting bath. Thus, in the practice of the present invention where the edges of a floating ribbon are supported in the manner already described, a central portion of the ribbon may be subjected to a fluid pressure from above to change the thickness of the ribbon.

Advantageously, gaseous support beneath the glass ribbon may be provided by a plurality of relatively small, closely adjacent pressure zones along each side of the tank containing the liquid supporting medium. Each zone is formed by an individual flow of gas from a reservoir under higher pressure, the flow being throttled between the reservoir and each zone to restrict the passage of gas between the two. Within each zone, gas entering from the reservoir is diffused after throttling to avoid creation of localized jets normal to the ribbon. Provision may be made for the escape of the flow of gas emanating from each zone through passageways interspersed throughout the support beds.

In lieu of separate pressure zones, the gaseous support may be provided in a continuous zone, as by emitting gas under pressure through a porous plate beneath the marginal edges of the ribbon. Exhaust channels, interspersed throughout the plate, provide zones of lower pressure to which the supporting gas may flow.

The attendant advantages of this invention and the various embodiments thereof will be readily appreciated as the same become better understood by reference to the following detailed description when considered in connection with the accompanying drawings in which:

FIG. 1 is a longitudinal section of an apparatus for producing glass according to the inventive process herein contemplated showing means for applying a superatmospheric pressure to the top of a ribbon of glass supported on a molten metal bath and for dividing the apparatus into separate pressure chambers;

FIG. 2 is a horizontal sectional view, with parts omitted, taken on line 2—2 of FIG. 1 looking in the direction of the arrows showing means for providing gas support for the longitudinally extending edges of a ribbon floating on a molten metal bath;

Figure 3:
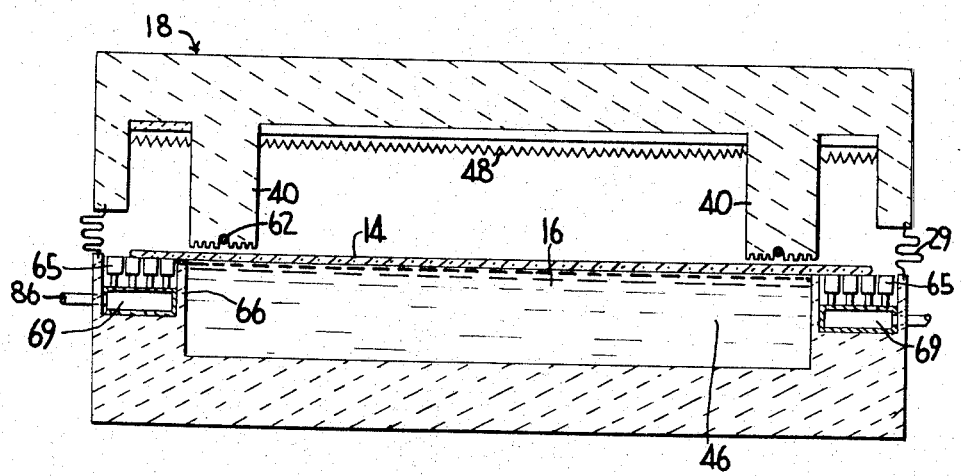
FIG. 3 is a sectional view taken on line 3—3 of FIG. 2 and in the direction of the arrows showing a central pressure chamber above the ribbon and the means for supporting the edges on a flow of gas.

With particular reference to the drawings, in FIG. 1 there is shown a pair of forming rolls 12 at the delivery end of a glass melting furnace of conventional construction (not shown) to form a ribbon of glass 14 which is delivered onto an apron arrangement 15 and thence onto the surface of a bath of molten metal 16 contained within a tank 18. The molten metal has a density greater than the glass ribbon 14, so that the ribbon floats on the surface of the molten metal. The metal may be tin, an alloy of tin, or the like.

In order to maintain the metal of the bath 16 in molten condition, thermal regulating means, such as electrodes 20 may be located in the floor of the tank 18, as illustrated, or may be submerged within the molten metal, so as to affect the temperature of the bath. The electrodes 20 are connected to a suitable source of power (not shown) in a conventional manner. Each electrode may be individually energized and controlled, so as to provide a desired thermal gradient within the various sections of the tank 18, as will be described. The glass ribbon 14, after treatment within the tank 18, is withdrawn from the tank without injury to its surfaces by traction or pinch rolls 22 onto a roller conveyor 24.

The tank 18 is constructed of a refractory bottom portion 26 and a refractory top portion 28, joined and sealed together, except for an entrance 18a and an exit 18b, by a suitable sealing means 29 (FIG. 3). The sealing means illustrated is of a bellows type and permits the top portion 28 of the tank to be raised from the bottom portion 26 for repairs, etc., without the necessity of removing refractory parts and the subsequent repair of removed parts. The bottom portion 26 contains the molten metal 16 and is subdivided into an entrance zone 26a, a heating zone 26b, a surfacing zone 26c and a cooling zone 26d. These zones are defined by submerged walls or baffles 30a, 30b, and 30c, so built to materially reduce convection currents in the molten metal between the various zones. Other submerged baffles 32 are in the cooling zone to control convection currents in that zone. The level of the metal of the bath is controlled by a level control weir 34 at the entrance end of the tank 18, a level control weir 36 at the exit end of the tank and by an inlet 38. Preferably, the metal level is always maintained so that the glass ribbon being treated remains free of contact with any submerged wall or baffle within the tank 18. The inlet 38 (see FIG. 3) is located through a wall of the tank 18 and is connected to a suitable source of molten metal to supply molten metal to the tank 18.

The space between the top portion 28 and the surface of the metal pool is divided into two chambers 28a and 28b by the front side of a circumferential wall 40. This wall depends from the roof 28 and has its side sections spaced from the walls of tank 18, thereby providing a gas space 28c along each side of the tank. This gas space 28c may, in effect, be a continuation or extension of chamber 28a.

A gas which is inert to the components of the bath, such as introgen or the like, is introduced, under pressure, into each gas chamber or pressure zone, through conduits 42 and 44, each connected to a suitable source of the pressurized gas (not shown). The gas is preferably heated, so as to eliminate chilling of the zones and the glass being treated. The pressure at which the gas is introduced into the zones 28a and 28c is different from the pressure of the gas introduced into the zone 28b. The pressure zone 28b may be further subdivided by walls or baffles 46a, 46b, 46c and 46d for temperature control purposes.

Radiant heaters 48 are located adjacent the roof of the tank 18 to maintain the desired glass temperature between the exit and entrance ends of the tank. These radiant heaters 48, located in both pressure zones, as illustrated, are connected in a conventional manner to a source of electric power (not shown) and may be individually controlled for temperature gradient control. The control means is any convention control means and need not be described and shown in detail. If necessary, cooling means can be located above the cooling zone to insure the proper temperature of the glass being removed from the bath.

Pressure within the zones of the tank above the molten metal is maintained and the leakage of inert gas from the zones is minimized by the use of fluid pressure seals 50 and 52 at the entrance and exit ends of the tank and by seal 54 associated with the wall 40. Suitable seals and other constructional details of the tank are disclosed and claimed in the copending application of Edmund R. Michalik and George W. Misson, Ser. No. 191,833, filed May 2, 1962. These seals are of similar construction and include a plurality of grooves 56 separated by lands 58 suitably supplied with a curtain of inert gas under pressure, as by apertured pipes 62 and 62a or apertured plenum chambers 63a and 63b. To prevent undue chilling of the glass, the gas may be heated.

The apron arrangement 15 may take several forms without departing from the spirit of the invention. For example, it may include a conventional series of rollers, as illustrated in U.S. Patent No. 1,954,077 to Gelstharp, or it may be a slip table, as illustrated in U.S. Patent No. 1,657,212 to Hitchcock.

Figure 4:
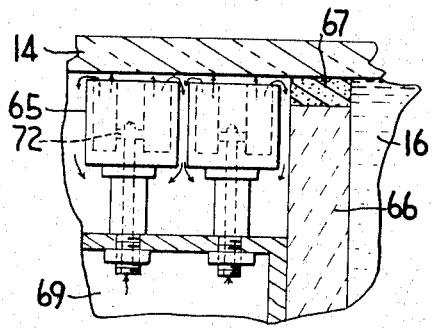
FIG. 4 is an enlarged partial view of the inside edge of the tank wall of FIG. 3 showing the boundary between the liquid bath and the gas support bed.

Along each longitudinally extending side of the molten bath there is provided, substantially contiguous therewith and at the same level, a gas support bed adapted to underlie the marginal edges of ribbon 14. (See FIGS. 2–4.)

The upper surface of the longitudinally extending side walls of bottom portion 26 of tank 18 includes an inset bed of open-topped chambers or modules 65, the upper peripheries of which lie in a common plane slightly below a marginal edge or lip 66 of the tank wall containing the molten bath. Modules 65 are small with respect to the length and width of the tank fall. Preferably, the upper surface 67 of the marginal edge or lip 66 is formed of a material that is non-wettable to glass, such as graphite.

Figure 5:
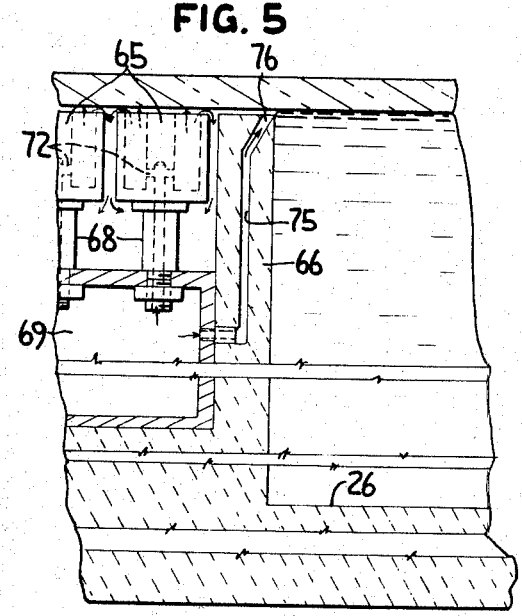
FIG. 5 is an enlarged partial view of the inside edge of a tank wall showing another embodiment of boundary means between the liquid bath and the gas support bed.

There is shown in FIG. 5 a different arrangement of the marginal edge of the tank wall utilizing a lip 66′ slightly lower than the level of the molten bath. A plurality of passageways 75, communicating with a continuous narrow slot 76 extending along lip 66′, supply gas under pressure from plenum 69 to a zone immediately above the upper surface of lip 66′. The gas is emitted from slot 76 in the direction of the interface between the floating ribbon and the molten metal and provides a fluid seal between the glass and the lip to contain the liquid bath within the bottom portion 26 of tank 18. Gas is supplied to the slot 76 by the plenum chamber 69 that also supplies gas to modules 65. With this arrangement contact of the ribbon with the tank walls is avoided.

As shown in FIGS. 2–7, the modules 65 of each marginal support bed are in spaced but close juxtaposition, each to the other, and arranged geometrically like a mosaic. In the embodiment illustrated, all modules 65 have their upper termini of rectangular configuration and lying in a common plane. The modules 65 are arranged in successive rows crossing the intended path of travel of the ribbon margins, each row being at an angle other than 90 degrees from the path and spaced close to the next adjacent row.

Each module 65 has a hollow stem 68 of smaller cross sectional area than the upper terminus and each opens into a plenum chamber 69 positioned below the module bed and acting as a support therefor. Each module is substantially enclosed and is separated from other modules by an exhaust zone 70, which is enlarged as at 70a beneath the module chambers to provide escape paths to the gas. The bed is adjusted to such level that the plane of the upper terminus of the modules lies parallel to, but just below by approximately the height of the gap between the modules and the support height of the ribbon edges, the plane defined by the bottom surface of the floating portion of the ribbon. Pipes 71 supply inert gas, such as nitrogen, under pressure to plenum chambers 69, the gas being emitted to the chambers of modules 65 through restrictive orifices 72. The modules and plenum chamber are made of metal or refractory materials that will withstand high operating temperatures.

In the operation of this device a ribbon of glass is formed by passage of molten glass between a pair of forming rolls 12 from a source thereof, such as a conventional glass melting tank, and the ribbon 14 is delivered to the front section of the tank 18 passing through the front or entrance seal 50.

Gas which is inert to the metal is fed into a pipe 62a and flows downwardly impinging against the glass and thereby isolates the interior of the tank 18 from the outside atmosphere. A similar gas is supplied to the plenum chamber 63a under pressure high enough to cause the gas in this chamber to flow through the orifices into the grooves 66 and to hold the ribbon away from the solid parts of the tank.

In general this gas is preheated by means not shown to a temperature sufficiently high to prevent undue cooling of the glass. Normally, the temperature of the gas supplied to pipe 62a and chamber 63a will be above 500° to 1000° F. and often in the range of 1400° F. up to a melting temperature of the glass.

After the ribbon 14 has entered chamber 28a it is laid upon the surface of the molten metal and is led through the seal 54 into the chamber 28b.

As shown in the drawings, the ribbon 14 has a width greater than that closed by the wall 40, thus providing a narrow margin which extends beyond the edges of the wall 40 into the chambers 28c. Sealing gas is delivered to the pipes 62, disposed in the wall 40 and caused to impinge against the edge portions of the ribbon 14 which is immediately below the walls 40, thereby separating the chamber 28b from 28c by a gaseous curtain. This gas is supplied at a pressure equal to or greater than the pressure established on each side of the curtain. The temperature of the gas supplied to front section and side sections of these walls in front of baffle 46a generally should approximate a melting temperature of the glass or at least should be high enough so as to avoid cooling the ribbon edges below a melting temperature.

The ribbon 14, while floating on the metal surface, advances through the chamber 28b and finally is withdrawn from the tank 18 passing through the seal 52. It is pulled from the tank between the traction rolls 22 which may, if desired or if necessary, exact enough tension upon the ribbon to keep it moving.

Figure 7:
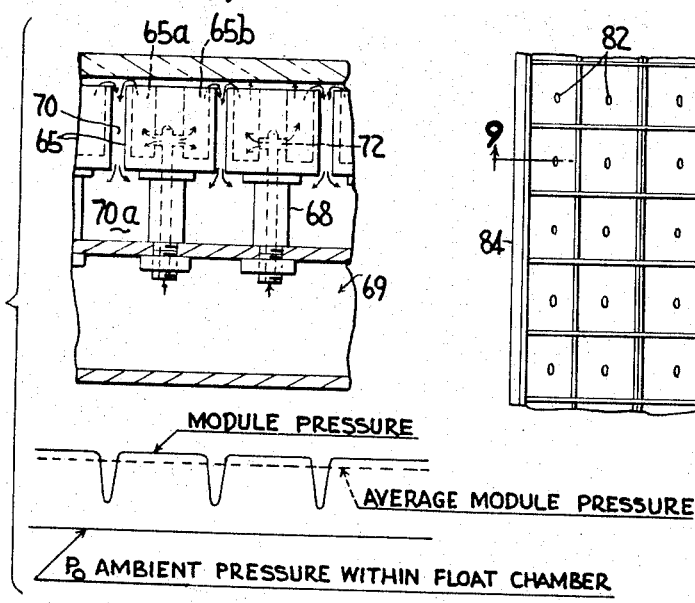
FIG. 7 is a sectional view taken on line 7—7 of FIG. 6 looking in the direction of the arrows indicating, schematically, the flow of gas and including diagrammatic pressure graphs.

As shown in the drawings, the molten metal in the tank 18 is maintained at a level even with the top surface of the bottom confining side walls of the tank 18 and the ribbon width extends beyond the inside faces thereof. Gas emitted from the adjacent module beds beneath the extending portions of the ribbon margins provides a plurality of individually supplied pressure zones that function independently from each other and exert a supporting force upon the overlying glass. The independent functioning is assured by supplying each separate chamber or module 65 from a separate orifice. FIG. 7 schematically indicates the principal flow of gas. The relatively small size of orifices 72 provides a drop in gas pressure from the plenum to the interior of the modules. Not only are slight variations in plenum pressure minimized thereby, but also the gap between the upper terminus of each module and the lower surface of the ribbon edges becomes self-adjusting to a uniform spacing about the periphery of each module or, if divided, each sub-module. This occurs because any decrease in the gap results in a build-up of pressure within the module cavity, thereby exerting the necessary force, as great as the plenum pressure if necessary, to move the ribbon away from the module. As this occurs, the gap becomes larger and the pressure within the module cavity is reduced by the escape of gas through the larger gap. To be responsive to localized changes in spacing that do not occur along an entire ribbon margin, it is necessary that the modules be relatively small with respect to the length and width of the overlying portion of the ribbon. For this reason small chambers, such as subdivisions 65a, b, c and d, function extremely effectively, each subdivision providing support when covered. The gas is diffused in each module and, after flowing from the open end beneath the glass, exhausts to zones of lower pressure provided by channels 70. The uniform support pressure thereby provided is diagrammatically indicated by the graph of FIG. 7. Various module designs and their construction, suitable for providing the gaseous support contemplated herein, are disclosed in the copending application of James C. Fredley and George E. Sleighter, Ser. No. 139,901, filed Sept. 22, 1961, and in the copending application of George W. Misson, Ser. No. 236,036, filed Nov. 7, 1962.

Graphite insert 67 of the marginal lip 66, being non-wettable to the glass ribbon, is capable of supporting the narrow portion adjacent the margins without interfering with the movement of the ribbon. Any slight surface damage caused by contact between the insert and the ribbon is inconsequential in most instances because the edges are normally trimmed.

By supplying gas through support modules 65 at a temperature cool enough to stiffen the marginal edges widthwise stability of the ribbon is enhanced. The marginal edges, because supported entirely upon gaseous pressure zones, assume a rounded or bulb edge.

As the ribbon 14 passes through the chamber 28b, the temperature is maintained high enough to cause the ribbon to become molten during a substantial distance of its path. During this time the surfaces of the ribbon smooth out and the ribbon seeks an equilibrium thickness the magnitude of which is dependent upon the pressure established within the chamber 28b.

The pressure required in the chamber 28b depends upon the thickness desired and the external pressure, i.e., the pressure in the chambers 28c into which the edges of the ribbon extend. Where it is desired to produce a ribbon thinner than the aforesaid equilibrium thickness of about 0.27 inch, the pressure in the chamber 28b should be at least 0.01 ounce per square inch above that pressure at the edges of the molten ribbon e.g., in the chambers 28c.

For example, the ribbon tends to stabilize at a thickness of 3/16 inch when the pressure differential is 0.11 ounce per square inch.

The degree of stabilization is a function of time. Consequently, it is readily possible to produce glass 0.125 inch in thickness simply by sizing the thickness of the ribbon at this thickness or slightly lower, subjecting the sized ribbon to the treatment herein contemplated at a suitable pressure of about 0.2 ounce per square inch, which includes improving its surfaces, and removing the sheet before its thickness can grow unduly.

In general, the pressure differential established between the chamber 28b and that at the edge of the sheet or ribbon ranges from 0.01 to 2 ounces per square inch. Higher differential pressures normally are unnecessary and may be difficult to maintain. They should in no event be so high as to cause the ribbon to break and rarely are above 5 to 10 ounces per square inch.

The temperature established in the fore part of the chamber 28b is a melting temperature of the glass of the ribbon. Toward the end, i.e., beyond baffle 46a, the temperature is reduced low enough to ensure delivery of a stable ribbon which is not marred by contact with rolls to the discharge end of the tank, for example 600 to 800° F. or below.

The rate of movement of the ribbon over the pool is controlled so as to ensure a smoothing of the surfaces of the ribbon and, in general, this is best accomplished by bringing a section of the ribbon to molten state.

It will be understood that the gas discharged through pipes 62 along walls 40 is supplied at a pressure or at a velocity sufficient to maintain the pressure differential between chambers 28b and 28c. As previously explained, the gas, which is discharged in this way beside areas where the ribbon is being heated to or is held at a melting temperature, is heated to a temperature substantially that of the glass. On the other hand, at the farther ends of the chamber, e.g., beyond baffle 46a, the ribbon is cooled and gas supplied to pipes 62 along these portions of wall 40 normally is substantially cooler, rarely above the temperature of the portion of ribbon opposite such wall portions and may advantageously be much lower in temperature.

Where glass of equilibrium thickness is desired or where the ribbon is to be attenuated to accomplish a diminution of the thickness, circumferential wall 40 and associated fluid pressure seals may be omitted or the pressure within chamber 28b may be maintained equal to the pressure of the surrounding chambers. If the ribbon is attenuated, a decrease in ribbon width accompanies the decrease in thickness. The tank walls with their associated module beds must therefore be angled to create a tank having a tapered zone that diminishes in width in the direction of ribbon travel to maintain the ribbon edges properly supported on the support beds.

Example

A ribbon of glass of convenient width, for example 12 inches or more, having a composition, by weight, of 71.38 percent $SiO_2$, 13.26 percent $Na_2O+K_2O$, 11.76 percent $CaO$, 2.54 percent $MgO$, 0.75 percent $Na_2SO_4$, 0.15 percent $Al_2O_3$, 0.11 percent $Fe_2O_3$ and 0.06 percent $NaCl$ and a weight density of 2.542 grams per cubic centimeter is formed by a pair of rolls to a thickness of substantially .125 inch and delivered at 1400° F. and floated upon the surface of a molten bath of metal of 100 percent tin having a weight density of 6.52 grams per cubic centimeter at 1800° F. The tank of molten metal is of the construction illustrated in FIGS. 1–4 of the drawings and is longitudinally divided into three sections, an entrance section, the metal of which is maintained at a temperature of 1500° F., a melting section, the metal of which is maintained at a temperature of 1900° F., and a cooling section in which the metal is at a temperature ranging from 1900° F. to 1000° F. The space above the metal is subdivided into two pressure chambers and pressurized gas is fed to each chamber. The gas is preheated to 1900° F. for this supply. The first chamber 28a is maintained at slightly above atmospheric pressure while the second chamber 28b is maintained at 0.5 ounce per square inch gauge pressure, so that a pressure differential of 0.2 ounce per square inch existed between the two chambers.

The width of the ribbon is such that the longitudinally extending marginal edges extend not only beyond the outer side edge of the pressure chamber but also beyond the metal bath, which is filled to a level even with the top of the side walls. Each edge of the ribbon overlies a side wall of the tank, extending approximately midway across the width of the respective side wall.

Modules, underlying the extending portions of the ribbon, are supplied with nitrogen gas that is under pressure and heated to a temperature of approximately 1300° F. to support and cool the edges. The gas is supplied to plenum chambers 69 at a pressure of approximately 8 ounces per square inch gauge. Orifices in the modules 65 reduce this pressure by a factor of approximately twenty times, providing a supporting pressure of 0.37 ounce per square inch gauge above the pressure existing above the glass, which provides sufficient force to support edges of the ribbon of a thickness up to 1/4 inch (the equilibrium thickness to which the edges tend to grow being outside the pressure chamber) at a spacing of approximately 0.010 inch above the modules.

Figure 9:
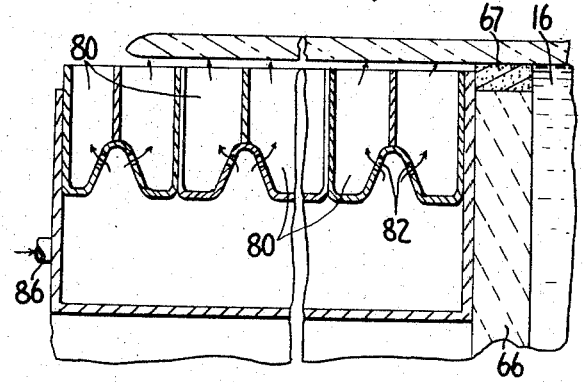
FIG. 9 is a sectional view taken on line 9—9 of FIG. 8 looking in the direction of the arrows and schematically showing the flow of gas.
Figure 8:
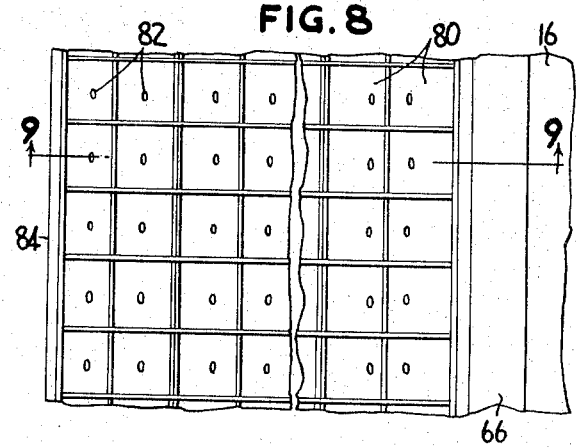
FIG. 8 is a partial plan view, similar to FIG. 6, of another embodiment of a modular array of pressure chambers.

Further embodiments of gas support beds suitable for supporting ribbon edges are shown in FIGS. 8 to 11. In FIGS. 8 and 9, a plurality of chambers or modules 80 are provided contiguous with each other and each supplied through a separate restrictive orifice 82 in direct communication with a plenum chamber 84 supplied with gas under pressure through inlet 86. No exhaust passages are provided between adjacent modules, and the principal flow of gas is diagrammatically indicated by arrows.

Figure 10:
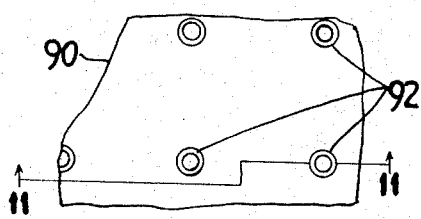
FIG. 10 is a partial plan view, similar to FIGS. 6 and 8, of another embodiment of means to provide a gaseous support beneath a portion of a floating ribbon of glass.
Figure 11:
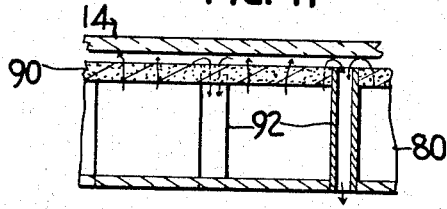
FIG. 11 is a sectional view taken on line 11—11 of FIG. 10 looking in the direction of the arrows and schematically showing the flow of gas.
Figure 6:
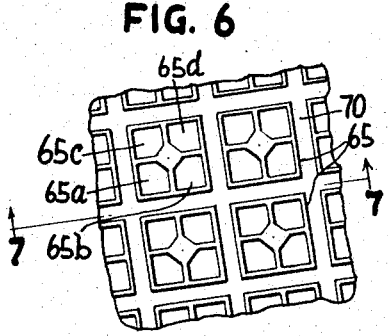
FIG. 6 is an enlarged partial plan view of the modular array of pressure chambers shown in FIG. 2.

FIGS. 10 and 11 show a plenum chamber 88 with a porous plate 90 forming the top and which can be used in lieu of the module beds disclosed. Gas fed to the plenum chamber under pressure is throttled and diffused as it escapes through the small, randomly spaced pores of plate 90. Where the width of the area supported is not great, as where ribbon margins are supported as contemplated herein, it is not necessary to provide exhaust zones intermediate the porous plate. For the most uniform support pressure, however, hollow tubes 92 are provided to communicate between the pressure zone beneath the supported glass and the surrounding atmosphere and provide exhaust passageways for the flow of supporting gas. In this manner a pressure build-up centrally of the support area is prevented in the same manner as by the exhaust zones surrounding modules 65.

Figure 12:
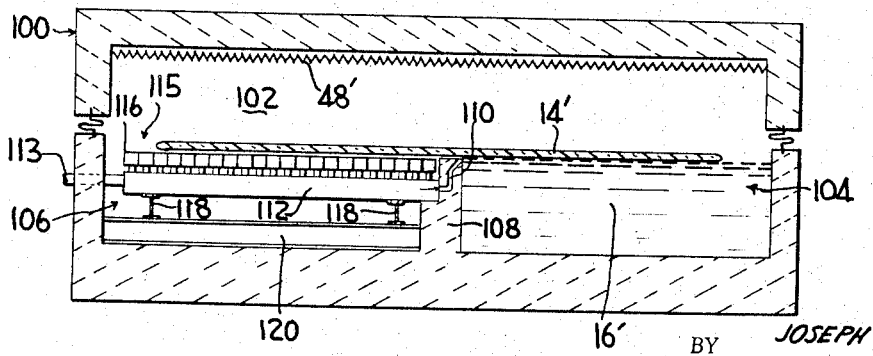
FIG. 12 is a transverse sectional view of a glass treating chamber including a tank of molten metal and a gas support bed, each supporting a portion of an overlying glass ribbon.

Apparatus for providing a further variant of the principles involved herein is shown in FIG. 12. In this embodiment, only one marginal edge of the ribbon 14' is supported on gaseous pressure zones and the area so supported has been extended to include a substantial portion of the ribbon. More specifically, a large enclosure 100 is provided for receiving and processing a preformed ribbon 14'. The formation of the ribbon and the construction of tank 100 are the same as described in conjunction with the tank 18 of FIGS. 1–4, except as hereinafter described. In this embodiment, only a single upper chamber 102 above the ribbon and bath is provided, although if different ribbon thicknesses are desired, such chambers can be provided.

The lower portion of tank 100 is divided longitudinally of the ribbon travel into two chambers 104 and 106 by an upright wall 108 that is shorter than the side walls of the lower portion of tank 100. A longitudinally extending groove 110 extends along the top surface of wall 108 and is supplied with gas under pressure from a plenum chamber 112 in chamber 106. This wall and groove is of the same construction described in connection with FIG. 5. Chamber 104 is filled with a molten metal bath 16' to a level even with the top of wall 108.

A flat module bed 115, including chambers or modules 116, of plenum chamber 112, and constructed in the manner described in connection with modules 65 and plenum chamber 69, is suitably supported, as by longitudinal beams 118 and cross beams 120, in chamber 106. The bed is adjusted to such level that the plane of the upper termini of the modules lies parallel to, but just below by approximately the height of the gap between the modules and the support height of the glass ribbon, the level of the molten bath 16'. Inert gas, such as nitrogen, introduced to plenum chamber 112 through inlet pipes 113 and from there fed to the modules and the slot 110 supports that portion of the glass that overlies the module bed 115 and the dividing wall 108 in the same manner as previously described with respect to the marginal portions of ribbon 14 in conjunction with FIGS. 1–4, 7 and 8.

Where a ribbon is formed, supported upon the apparatus above described, and heated to a melting temperature, the glass supported upon the liquid bath will attain characteristics of float glass, as above described. The ribon over the module bed supported on a flow of gas will achieve different characteristics, such as a slightly greater thickness and a rounded or bulb edge, due to the different support media.

Various other embodiments utilizing the principles of the present invention are also contemplated. For example, the gas support beds extending longitudinally along the metal bath for supporting the ribbon edges need not be horizontal, but may slope downwardly away from the bath in a lateral direction to the ribbon travel or may be horizontal but at a lower level than the bath by a distance greater than the normal bed-to-glass spacing. With these arrangements, the marginal portions of the ribbon are supported at a lower level than the central portion and the thickness of the central portion is changed.

Alternatively, the gas support bed may support a central portion of the glass ribbon and the edges may be supported at a slightly lower level on adjacent, longitudinally extending liquid baths to change the thickness of the central portion of the ribbon.

It is possible, with the above arrangements, to effect slight changes in the differences in level between the edges and the central portion of the ribbon by varying the gas pressure of the support bed to raise or lower the portion of the ribbon supported by the gas.

Although the present invention has been described with reference to certain specific details, it is not intended that such details shall be regarded as limitations upon the scope of the invention except insofar as included in the accompanying claims:

I claim:
1. A method of increasing the lateral stability of a section of a moving glass ribbon, substantially freely floating on a fluid bath and at a melting temperature of the glass, which comprises supporting a central, major portion of the ribbon on a molten metal, supporting the longitudinally extending marginal edges of the ribbon on gas and supplying the gas at a temperature sufficiently low to render the marginal edges of the ribbon stiffer than the central portion of the ribbon.

2. A method of increasing the lateral stability of a section of a moving glass ribbon, substantially freely floating on a fluid bath and at a melting temperature of the glass, which comprises supporting a major longitudinal portion of the ribbon on a molten metal, supporting another longitudinally extending portion on gas, and supplying the gas at a temperature sufficiently low to render the last-named longitudinally extending portion of the ribbon stiffer than the major portion of the ribbon.

3. A method of forming a ribbon of glass comprising the steps of,
   depositing molten glass upon a first fluid support upon which said glass flows laterally to an equilibrium thickness,
   simultaneously depositing said molten glass upon a second fluid support upon which said molten glass flows laterally to an equilibrium thickness different than that produced on said first-named fluid support,
   said first and second-named fluid supports being disposed adjacent to one another, one of said supports being of molten metal and the other of said supports being of gas,
   simultaneously flowing said molten glass laterally on said first and second-named fluid supports until the thickness of the molten glass on one of said fluid supports is different than that of the molten glass on the other of said fluid supports, and
   thereafter cooling said molten glass to form a ribbon having a portion thereof of a thickness different than that of another portion of said ribbon.

References Cited
UNITED STATES PATENTS

| | | | |
|---|---|---|---|
| 1,564,240 | 12/1925 | Hitchcock | 65—182 |
| 2,878,621 | 3/1959 | Zellers et al. | 65—182 |
| 2,911,759 | 11/1959 | Pilkington et al. | 65—182 |
| 3,048,383 | 8/1962 | Champlin | 65—181 X |
| 3,070,901 | 1/1963 | Allander et al. | |
| 3,223,501 | 12/1965 | Fredley et al. | 65—182 |
| 3,241,939 | 3/1966 | Mechalik | 65—99 |
| 3,250,604 | 5/1966 | Toytot et al. | 65—65 |

DONALL H. SLYVESTER, *Primary Examiner.*

D. CRUPAIN, G. R. MYERS, *Assistant Examiners.*

UNITED STATES PATENT OFFICE
CERTIFICATE OF CORRECTION

Patent No. 3,337,318                                                    August 22, 1967

Joseph A. Gulotta

It is hereby certified that error appears in the above numbered patent requiring correction and that the said Letters Patent should read as corrected below.

Column 1, line 70, after "major" insert -- central --; column 2, line 47, before "gaseous" insert -- the --; column 4, line 41, for "convention" read -- conventional --; column 5, line 69, for "closed" read -- enclosed --; column 9, line 33, for "ribon" read -- ribbon --.

Signed and sealed this 29th day of October 1968.

(SEAL)
Attest:

Edward M. Fletcher, Jr.                          EDWARD J. BRENNER
Attesting Officer                                    Commissioner of Patents